Nov. 19, 1957 G. M. STEVENSON ET AL 2,813,303
MOLDING APPARATUS
Filed Sept. 28, 1954 5 Sheets-Sheet 1

INVENTORS
GEORGE M. STEVENSON AND
CARROLL E. STEVENSON

BY Mead, Browne, Schuyler
& Beveridge
ATTORNEYS

Nov. 19, 1957 G. M. STEVENSON ET AL 2,813,303
MOLDING APPARATUS
Filed Sept. 28, 1954 5 Sheets-Sheet 2

Fig. 2.

INVENTORS
GEORGE M. STEVENSON AND
CARROLL E. STEVENSON
BY Mead, Browne, Schuyler
& Beveridge
ATTORNEYS

United States Patent Office 2,813,303
Patented Nov. 19, 1957

2,813,303

MOLDING APPARATUS

George M. Stevenson and Carroll E. Stevenson, Baltimore, Md.; said George M. Stevenson assignor to Edwin E. Stevenson, Baltimore, Md.

Application September 28, 1954, Serial No. 458,822

12 Claims. (Cl. 18—20)

This invention relates to molding apparatus and more particularly to a machine for mass-producing small molded articles such as plastic caps for bottles and the like.

It is an object of this invention to provide a molding apparatus capable of efficiently mass-producing relatively small plastic articles such as plastic screw caps.

It is another object of this invention to provide an automatic molding apparatus particularly suitable for molding small articles, and in which a relatively large number of molded units may be simultaneously processed.

It is still another object of this invention to provide an apparatus for mass-producing small molded articles, such as plastic caps for bottles, which is characterized by economy, flexibility and adaptability to the manufacture of molded articles of different sizes.

It is a further object of this invention to provide an apparatus for mass-producing small molded articles in which the productive capacity of the apparatus is increased by reducing to a minimum the space requirements associated with non-productive steps in the molding cycle, such as the steps of loading and unloading the molding heads.

It is a still further object of this invention to provide a molding apparatus which includes a plurality of heated molding heads supported by a single revolving turret or carriage member, with means for moving the carriage and each individual molding head carried thereby past a plurality of processing stations which perform various operations contributing toward the production of the final molded article.

In accordance with these objectives, this invention provides a molding machine including a rotatable turret-like support structure on which are mounted a plurality of molding heads. Each molding head comprises a spring-biased threaded male mold element and a vertically movable female mold element. The female mold element rides along a guide rail or track, the height of which determines the axial displacement between the male and female molding members. A loading station is provided at the point on the fixed path corresponding to the beginning of the molding cycle for dispensing a predetermined measured quantity of a powder-like molding material to the female mold element. An intermittently driven vertically movable conveyor member is provided for moving the female mold element vertically upwardly into engagement with the male mold member and into engagement with an elevated portion of the guide track along which the female mold element of each mold head rides during the greater portion of the molding cycle.

Means are also provided near the end of the path followed by the molding apparatus for "cracking" the molded article loose from the threaded male mold element by imparting a rotary movement to the male mold element. A lowering station including an intermittently vertically movable conveyor is provided adjacent the end of the fixed path for lowering the female mold member out of engagement with the molded article. A spinning station is provided for spinning the molded article out of engagement with the male molding member after the female molding member has been disengaged from the article. A heating means is provided for separately heating the male and female mold members of each molding head during the entire molding operation. In the embodiment shown in the drawings, the heating means includes gas burners in the individual mold heads, the gas burners being supplied with the proper fuel mixture from a common manifold rotatable with the turret member which supports the mold heads.

Other objects and advantages will be seen from the following specification taken in conjunction with the accompanying drawings in which.

Referring now to the drawings, the apparatus includes a stationary supporting stand generally indicated at 10 mounted upon a flat base 12. A stationary carriage-supporting member 14 of generally circular configuration is mounted upon the upper surface of the stand 10 and includes a pedestal-like stationary column 16 which serves as a bearing for a rotatable turret or carriage 18. A track 15 which determines the displacement between the male and female molding assemblies of each molding head extends around the outer periphery of support 14. Roller bearings 20 are interposed between stationary column 16 and rotatable carriage 18 adjacent each end of column 16. A driving means, such as an electric motor 22, is disposed underneath stand 10 and drives a shaft 24 which carries at its upper end a pinion gear 26. A ring gear 28 is carried by the lower surface of turret or carriage 18. The motor driven gear 26 engages ring gear 28 to cause rotation of carriage 18.

A plurality of similar molding heads each generally indicated at 30 are circumferentially spaced about and supported by rotatable carriage 18, the heads 30 extending radially from carriage 18.

Each molding head 30 comprises a vertically extending casing 32 having a pair of radially extending upper and lower arm portions generally indicated at 34 and 36. Upper arm portion 34 supports a male molding assembly generally indicated at 38 while lower arm portion 36 supports a female mold assembly generally indicated at 40. The details of these molding assemblies and their operation will be described hereinafter. Each molding head includes a hollow chamber 33 which extends vertically for substantially the entire height of the molding head at the radially inner portion thereof (see Figs. 4 and 5).

Means are provided to separately heat the male and female molding assemblies of each molding head. In the embodiment shown, a gaseous fuel mixture serves as the heating medium.

Figure 2:
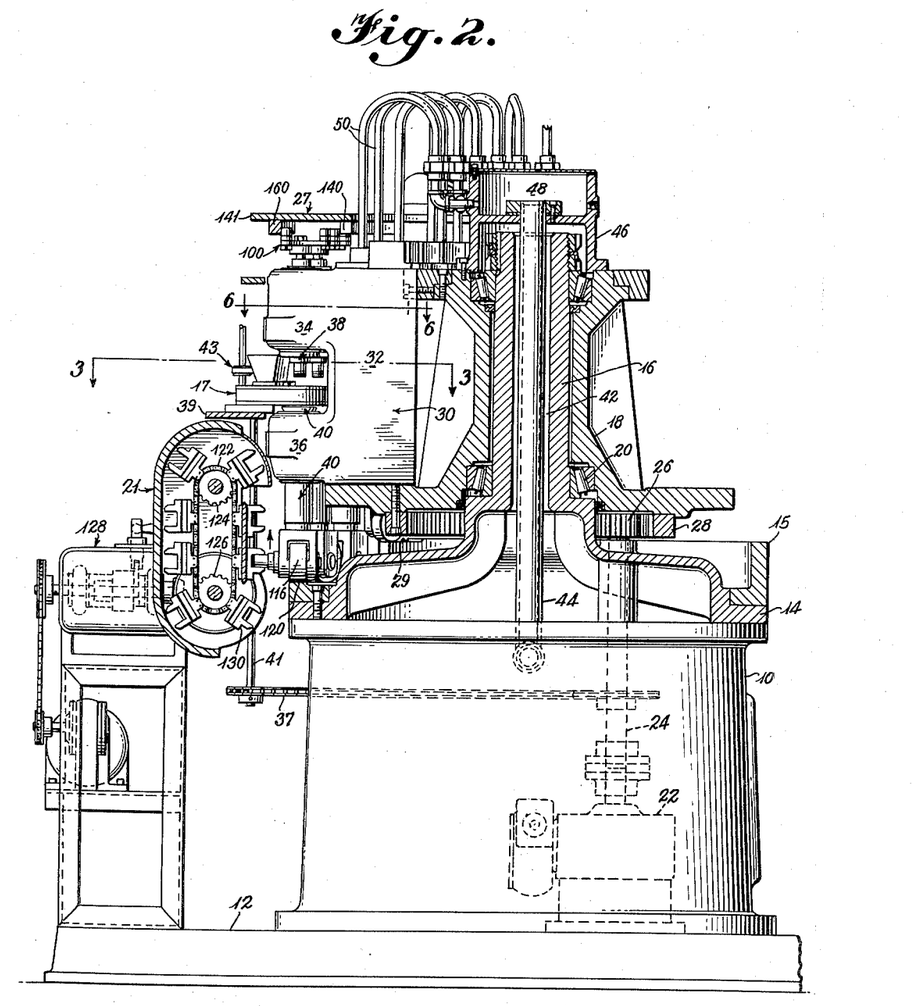
Fig. 2 is a view in vertical section along line 2—2 of Fig. 3.

As best seen in Fig. 2, vertical column 16 is provided with an axially extending hollow passage 42 through which a gas supply conduit 44 extends into communication with the interior of a dome-like casing 46 which is secured to and turns with the upper end of rotatable support member 18. Casing 46 is coaxially positioned with respect to column 16 and conduit 42 and rotates with support member 18 about column 16 as an axis. The interior of casing member 46 is hollow to provide a manifold chamber 48. A conduit means 50 connects each of the molding heads 30 with manifold 48. As will best be seen in Fig. 4, the conduit 50 extends downwardly into the hollow chamber 33 of the individual molding head, and a pair of burner members 52 for heating the male molding assembly 38 is connected to the conduit 50 at a height corresponding to the lower portion of the upper arm 34. A second pair of burners 70 for heating the female molding assembly 40 is connected to the conduit 50 at a height corresponding to the lower portion of arm 36.

As can be most clearly seen in Figs. 4, 5 and 6, upper arm portion 34 is provided with a solid core 54 having a vertically extending bore 56 which receives the male molding assembly 38 as will be described in more detail hereinafter. A duct generally indicated at 58 for the passage of combustion gases surrounds the outer periphery of the core 54, the outer boundary of the duct 58 being defined by the inner surface of the outer wall of casing 32. The duct 58 includes horizontally extending upper and lower duct portions 60 and 62 separated from each other by a horizontal partition 64 which extends from the vertical chamber 33 to a point adjacent the forward portion of the arm 34. The partition 64 stops short of the forward or radially outer portion of the arm 34, permitting the forward ends of horizontal duct portions 60 and 62 to form a common vertical duct portion 59. As will best be seen in Fig. 6, each of the upper and lower duct portions 60 and 62 includes two parallel flow paths around the central core 54.

The burners 52 for the male mold member are located adjacent the inlet end of the lower horizontal duct portion 62. One burner extends into each of the parallel flow paths of lower duct portion 62. It will be seen that the hot combustion gases produced by burners 52 pass radially outwardly with reference to the central axis of the apparatus through lower duct portion 62 and into vertical duct portion 59 where the gases pass upwardly and thence radially inwardly through upper duct portion 60. The gases then emerge from duct portion 60 and pass into chamber 33 from whence they are exhausted through the upper exhaust outlet 66. An inspection opening 68 covered by a removable plate 69 is positioned in the radially outer wall portion of the casing arm 34 and permits access to vertical duct portion 59 for inspection and cleaning.

The heating of the lower or female molding assembly of each molding head 30 is provided in substantially the same manner as just described for the male molding assembly. The lower arm 36 has a central core 54' having a vertically extending bore 56' which receives the female molding assembly 40. A duct generally indicated at 58' surrounds the core 54' and includes upper and lower horizontal duct portions 60' and 62' separated by a horizontal partition 64'. Duct portions 60' and 62' communicate with each other at the forward or radially outer end of arm 36 through vertical duct portion 59'. Burners 70 extend into lower duct 62'. The hot combustion gases from burners 70 pass radially outwardly through lower horizontal duct 62', thence into vertically extending duct portion 59', where they temporarily merge and then pass radially inwardly through the horizontally extending upper duct portion 60'. The combustion gases emerge from upper duct portion 60' and pass into the vertical chamber 33 of the mold head from whence they pass outwardly through the exhaust outlet 66. An inspection opening 68' covered by inspection plate 69' is provided in the outer wall of the lower arm 36 and permits access to the vertical duct portion 59' for inspection and cleaning.

The male molding assembly generally indicated at 38 includes a male molding element 72 having threads 74 at its lower end. Mold element 72 is integral with a shank portion 76 of larger diameter than the mold element. The upper end of shank portion 76 is provided with a shoulder portion 78 of greater diameter than the shank portion. A rod or stem portion 80 is in screw-threaded engagement with the upper end of the shank 76. Thus rod 80, shank 76 and mold element 72 are an integral connected unit. The male molding assembly just described including mold element 72, shank 78 and stem or rod 80 extends axially within bore 56 of upper arm 34 of the mold head. A plug-like lower bearing member 84 having a threaded outer surface is secured in the lower end of bore 56 of arm 34 and is itself provided with an axially extending bore 86 through which shank portion 76 and mold element 72 extend.

The upper end of the lower bearing member 84 is provided with a counterbore portion 88 which serves as a seat for shoulder 78 of shank portion 76. A disc or washer member 90 having a central aperture to receive stem 80 is seated on the upper end surface of bearing member 84 and serves as a bearing seat for a spiral spring member 92. When the male molding assembly 38 is in the non-molding position shown in Fig. 4, there is a small clearance, such as .005 inch, between the lower surface of washer 90 and the upper surface of shoulder 78. In this position, spring 92 cannot exert pressure on shoulder 78 of shank portion 76. When the male and female molding members are in the molding relation shown in Fig. 5, shoulder 78 of shank 76 is raised from its seat in counterbore 88 and bears against the lower surface of washer 90. The upper end of bore 56 of arm 34 is closed by a plug-like upper bearing member 94 having external threads which engage internal threads of bore 56. Upper bearing member 94 is provided with an axially extending bore through which the upper end of stem 80 passes. The upper end of the spring 92 bears against the underneath or lower surface of bearing plug 94. Thus, spring 92 is confined between the upper surface of the washer or spring seat 90 and the lower surface of the bearing plug 94 so that the degree of compression on the spring is dependent on the spacing between these two confining surfaces. The spring compression may be adjusted by varying the position of the bearing member 94 along its threaded engagement with the bore 56.

At the upper end of the stem 80 and above the upper surface of the bearing member 94 is positioned a cracking device generally indicated at 100 which includes a triangular-shaped plate 96 rigidly attached by means of a hub member 98 to the upper end of the stem 80. Three vertical post members 102, 104 and 106 are carried by plate 96 and are displaced from each other by substantially 120 degrees. As will be explained later, the cracking assembly 100 is used to crack the threaded male molding element 72 loose from the molded article near the end of the molding cycle.

The female molding assembly generally indicated at 40 includes a vertical shaft 108 which extends axially through the bore 56' in the lower arm 36 of the molding head 30. The upper end of shaft 108 is provided with a short stem portion 109 of reduced diameter to receive a removable nut member 110 having a molding cavity 111. The lower end of the nut 110 is provided with a cavity having a screw thread adapted to engage the screw thread of stem 109. The screw-threaded engagement of the nut 110 permits easy interchangeability of the nut, thereby permitting substitution of nuts 110 having different size molding cavities. In a similar manner, the screw-threaded engagement of shank 76 of the male molding member with the stem 80 permits easy replacement or substitution of the male molding member. The upper end of nut 110 is flared outwardly as indicated at 112 to cause droppings from the molding members to drop radially outwardly of the bore 56', thereby avoiding any interference with the sliding movement of shaft 108.

At its lower end, shaft 108 supports a yoke member 114 which in turn supports a roller 116. The roller carries a stub shaft 118 which projects outwardly beyond yoke 114, with respect to the central axis of the apparatus. Roller 116 is adapted to roll along track member 15 which is secured to the upper surface of stationary carriage support member 14. Track 15, upon which roller 116 rides, extends in the present embodiment in an endless circular path and serves to regulate the displacement between the male and female mold members.

Figure 3:
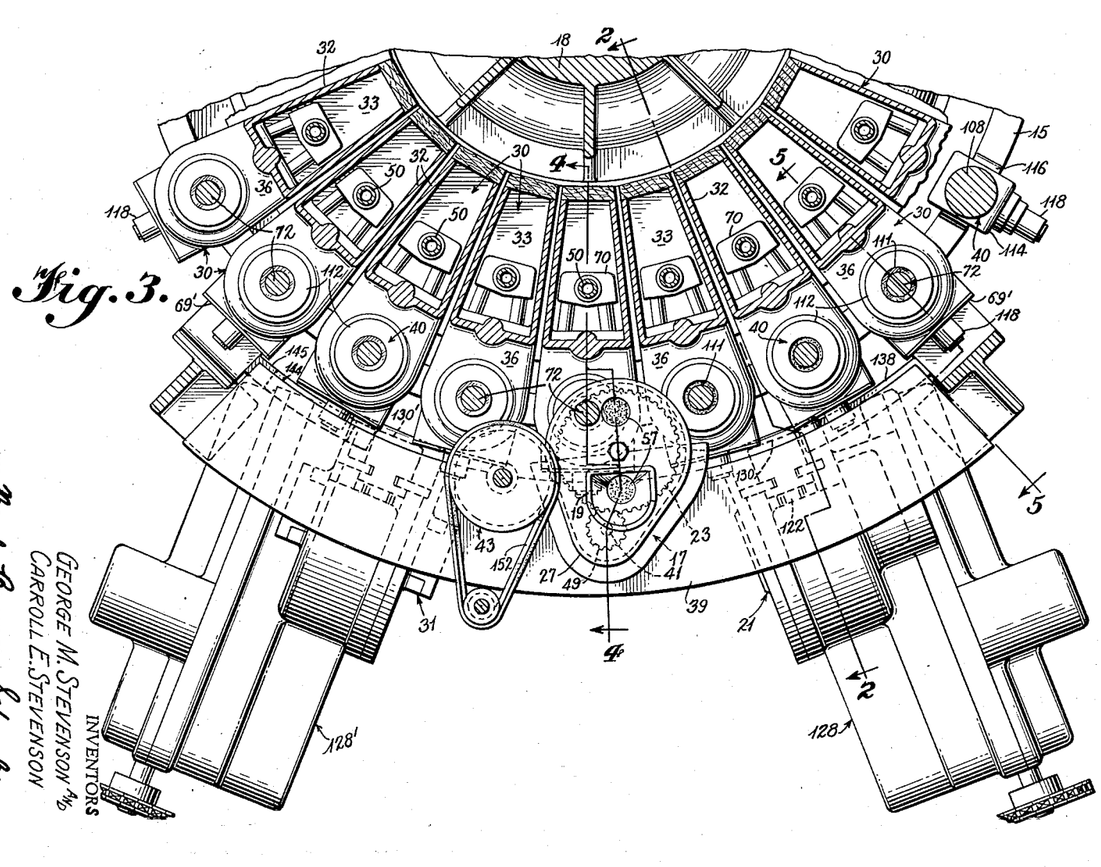
Fig. 3 is a view in horizontal section along line 3—3 of Fig. 2.
Figure 7:
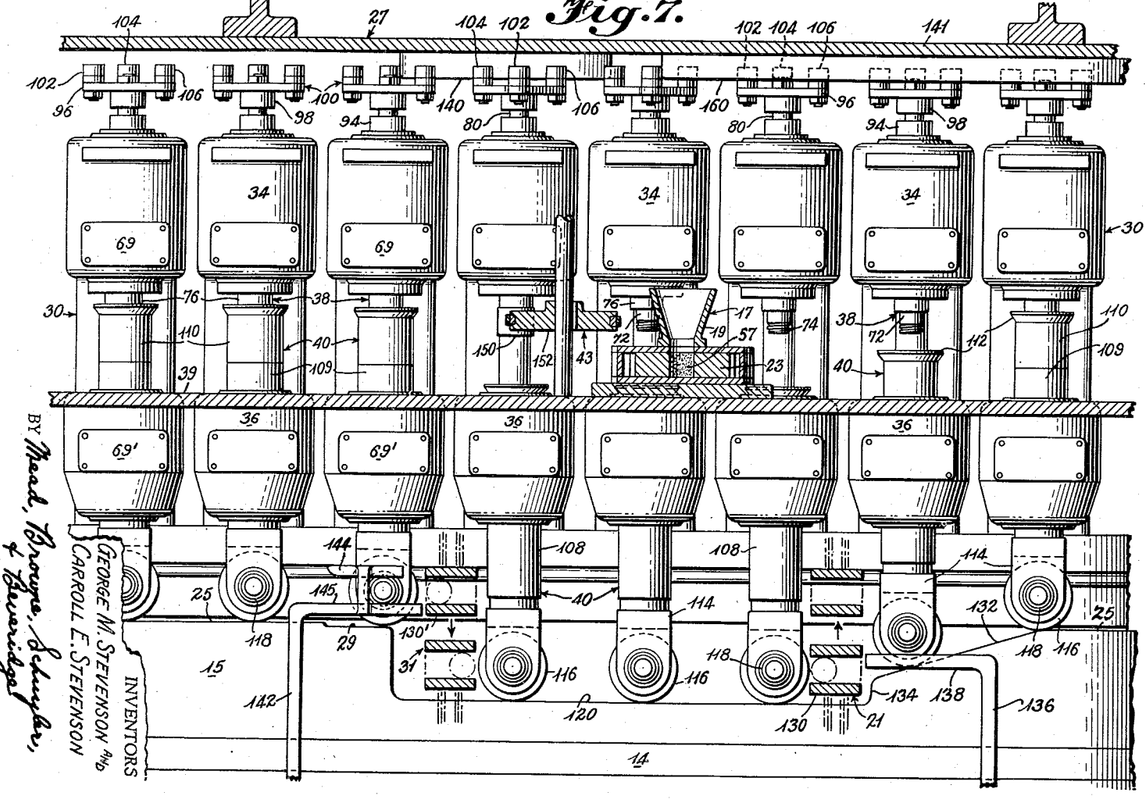
Fig. 7 is an elevation view partially in section, along line 7—7 of Fig. 1.

As will be most clearly seen in Fig. 7 of the drawings, a plurality of stations for performing various operations in connection with the molding process are positioned within a relatively short arc of the total periphery of the circular track 15. The loading station generally indicated at 17 may be a conventional type of loading or dispensing apparatus suitable for dispensing a material used in a molding process. Loading station 17 includes a funnel-like member 19 which receives the molding ingredients from a suitable supply source. Funnel 19 dispenses the molding ingredient to a disk 23 (Figs. 3 and 4) having a plurality of circumferentially spaced cavities 57. Each cavity 57 is adapted to receive a charge of the molding material as it passes beneath the mouth of funnel 19. Disk 23 is provided with gear teeth on its outer periphery which are engaged by a driving pinion 49 mounted on shaft 41. Shaft 41 is driven in timed relation to the movement of the rotatable turret 18 through a drive belt or chain 37 (Fig. 2) driven by motor 22. Disk 23 is disposed in a plane which lies between the arms 34 and 36 of the molding head 30 and at such a height as to lie above the open mouth of the cavity 111 of the female mold assembly when the female assembly is in its retracted or loading position, shown in Fig. 4. When the mold cavity 57 of the disk 23 aligns with cavity 111 of the female mold member, the molding charge is deposited in cavity 111. In the region indicated at 120 (see Fig. 7), track 15 is of such height above its supporting member 14 as to cause the female molding assembly to drop to the position shown in Fig. 4 in which it is below the plane of the disk 23 and is therefore in a position to receive the molding ingredient from cavity 57 of disk 23.

An elevating station generally indicated at 21 is provided adjacent the end of depressed portion 120 of track 15 in order to assist in raising the female mold assembly toward the male mold assembly. Elevating station 21 includes a rotating conveyor chain 122 (Fig. 2) which passes around two sprocket members 124 and 126. Chain 122 is intermittently driven in timed relation to the movement of turret 18 by a driving mechanism generally indicated at 128 which drives the sprocket 124. The portion of chain 122 disposed adjacent stub shafts 118 rotates in an upward direction in order to elevate the female mold assemblies. Chain 122 carries a plurality of U-shaped lug members 130 and rotates in a vertical plane substantially perpendicular to the horizontal plane in which portion 120 of track 15 lies. As will best be seen in Fig. 2, the conveyor mechanism is positioned radially outwardly of track 15 with respect to the central axis of the apparatus and is so positioned that lugs 130 during their upward movement are adapted to engage stub shaft 118 of roller member 116; that is, as roller 116 of each successive molding head 30 reaches the right-hand end of depressed portion 120 of track 15, with respect to the view shown in Fig. 7, the stub shaft 118 of each respective roller 116 slides between the jaws of one of the U-shaped lug members 130. The stub shaft rolls across the conveyor lug because of the rotary movement of carriage 18, and at the same time the upward movement of the conveyor moves the female mold assembly upwardly.

The conveyor mechanism at the elevating station 21 lifts the female molding assembly including the shaft 108, the yoke 114, the roller 116 and the stub shaft 118, upwardly for a predetermined distance, such as two and one-quarter inches, for example, and deposits the roller 116 adjacent the inclined portion 132 of track 15. The inclined track portion 132 is connected at its left-hand end, with respect to the view shown in Fig. 7, to a substantially perpendicular drop-off portion 134 which connects at its lower end to depressed portion 120 of track 15. The upper end of the inclined track portion 132 terminates at the level of elevated track portion 25.

In order to prevent roller 116 from moving off the conveying lug member 130 in an arcuate path as the roller leaves the conveying lug, an angle iron member 136 having a horizontally extending arm 138 is positioned adjacent the discharge side of the elevating conveyor so that stub shaft 118 passes first onto the horizontal arm 138. The intermittent movement of the conveyor chain 122 is such that lug 130 which supports stub shaft 118 moves vertically upwardly just the proper distance to align with the upper surface of horizontal arm 138 and then stops to permit the stub shaft to move off the lug and onto horizontal arm 138. Stub shaft 118 rolls along arm 138 for a short distance as mold head 30 moves along its circumferential path until roller 116 contacts inclined track surface 132. The roller then moves upwardly along inclined surface 132 and in so doing raises shaft 108 which supports female mold cavity 111.

Figure 5:
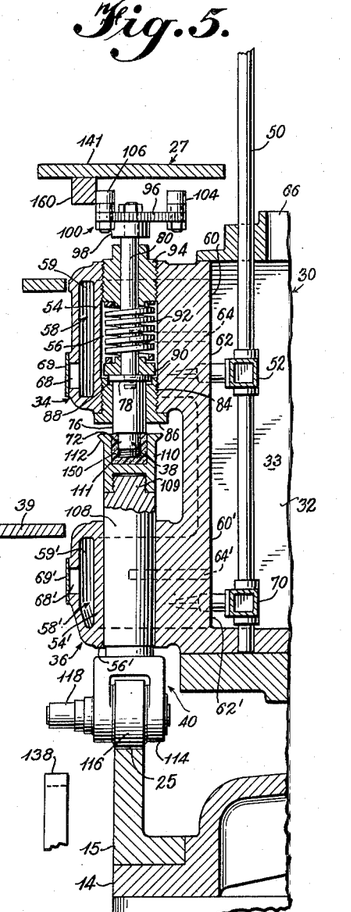
Fig. 5 is a view in vertical section along line 5—5 of Fig. 3.

By the time roller 116 has climbed to the top of inclined track portion 132 and has rolled onto the flat elevated portion 25 of track 15, the female mold element has been raised to the position shown in Fig. 5. In this position, male mold element 72 has entered female mold cavity 110 to the necessary depth to form the molded article and shank portion 76 of the male mold member has been forced upwardly a short distance against the force of its biasing spring 92 sufficiently to raise shoulder 78 a short distance, say 1/32 of an inch, off its counterbored seat 88. In this position of the molding members, the spring pressure on male molding element 72 may be of the order of magnitude of 1800 lbs. per square inch.

The molding head then rotates in a counter-clockwise direction along the elevated portion 25 of track 15 for approximately 270 degrees of rotation, in the embodiment shown in the drawings, with the male and female molding members in the position shown in Fig. 5 in which the male member exerts pressure on the molded material in the female mold cavity. During this period of rotation burners 52 and 70 are continually supplying heat to maintain the male and female molding assemblies in a heated condition, thus assisting in the cure of the molded article. At the end of the curing period the given mold head 30 has rotated in a counter-clockwise direction with respect to the view shown in Figs. 1 and 7, until it reaches the "cracking" station generally indicated at 27 in Fig. 7. By the time the molding head reaches cracking station 27, the molded article has become a hardened mass.

Just before reaching cracking station 27, roller 116 reaches a discontinuity in the track at which the track drops to level 29 slightly below the elevated level 25. For example, the level 29 may be approximately 1/8 of an inch below the elevation of portion 25 of the track. This permits the female molding assembly including roller 116 and shaft 108 to drop approximately 1/8 of an inch from the position shown in Fig. 5 and thereby relieves the pressure of spring 92 on male molding member 72 to facilitate the cracking operation which follows. A horizontally-extending cam member 144 (Fig. 7) is spaced above depressed track portion 29 and is adapted to engage the upper surface of stub shaft 118 as shown in Fig. 7 in order to assure that roller 116 drops to the level of depressed track portion 29.

As the roller 116 drops to the track level 29, stub shaft 118 engages the upper horizontal edge of arm 144 of an angle iron member 142 disposed adjacent track portion 29. The height of the upper edge of the arm 144 is such that the stub shaft 118 rides along the upper edge of arm 144 while, at the same time, the roller 116 rides along the depressed surface portion 29 of the track 15.

Figures 1, 6:
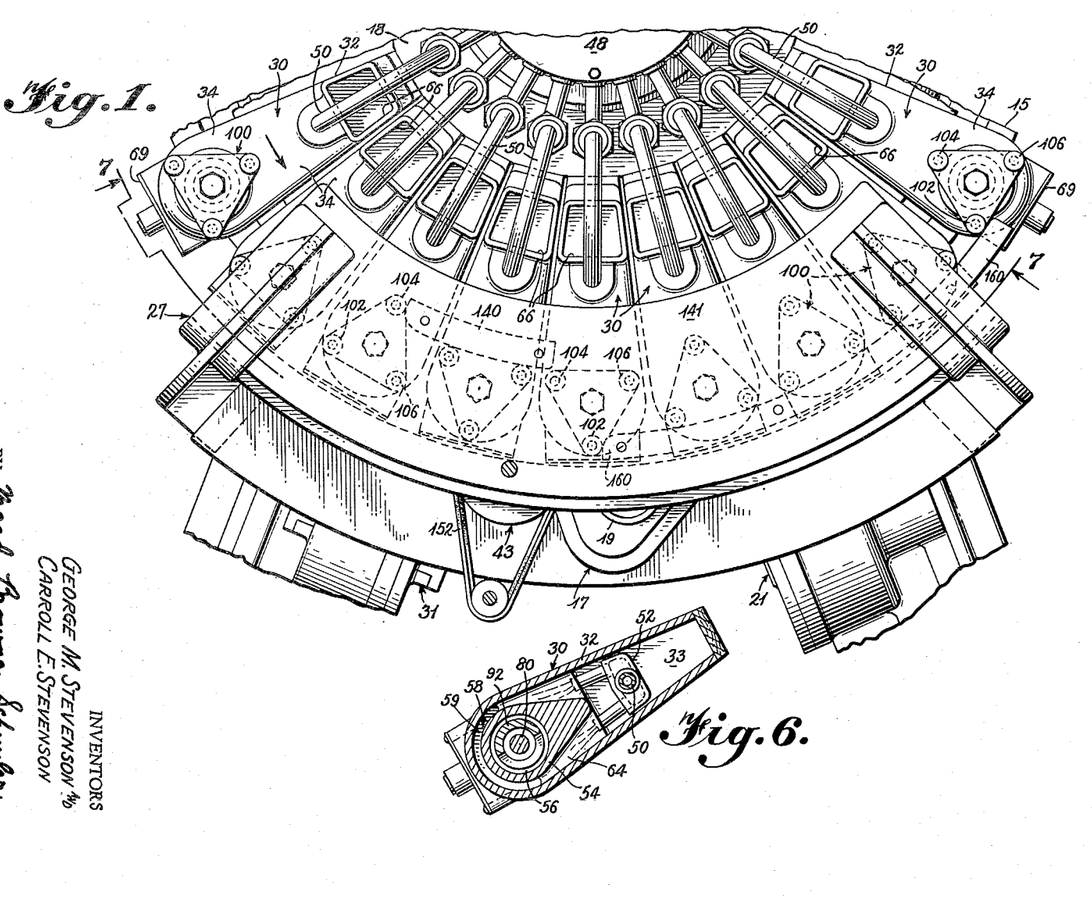
Fig. 1 is a fragmentary plan view of an apparatus in accordance with the invention.
Fig. 6 is a view in horizontal section along line 6—6 of Fig. 2.

As can best be seen in the views of Figs. 1 and 7, an arcuate circumferentially extending stationary track 140 is positioned in the path of the cracking assembly 100 carried at the upper end of the shaft 80 of the male molding assembly. Track 140 depends downwardly from a shelf-like member 141 which extends around the upper portion of the apparatus in the region of the cracking, lowering, loading and elevating stations. The post 104 carried by triangular-shaped plate 96 of cracking assembly 100 strikes against the end edge of track 140 and causes plate 96 and shaft 80 to rotate from position A (Fig. 1) to position B (Fig. 1). This loosens the engagement of the male molding member with the molded article to thereby facilitate the spinning operation which occurs at a subsequent station. The engagement of posts 104 and 106 with the track 140 in the position shown at B in Fig. 1 prevents rotation of stem 80 of the male molding member while the molded cap is spun off the threaded male molding element 72.

After passing the cracking station 27, the mold head 30 next reaches the lowering station 31. The lowering station 31 is similar to the elevating station 21 previously described and includes a conveyor chain 122' which carries a plurality of U-shaped lug members 130'. The horizontal arm 144 of angle member 142 projects beyond the end of depressed track portion 29 and overlies for a short distance depressed track portion 120, arm 144 extending to a point adjacent the pick-up side of conveyor 122'. Conveyor 122' moves in a clockwise direction (in a view similar to that shown in Fig. 2) in such manner that lugs 130' engage stub shaft 118 of roller 116 to carry the roller and the other portions of the female mold assembly in a downward direction until roller 116 is finally discharged onto depressed surface 120 of the track 15. Conveyor 122' is driven intermittently in timed relation to the rotation of turret 18 by driving mechanism generally indicated at 128'. The conveyor lug 130' at the lowering station is at the proper level to receive the stub shaft 118 of the roller 116 as the shaft moves off the horizontal arm 144 (see Fig. 7). The lug 130' then moves downwardly to the proper level to discharge the roller onto the depressed track portion 120 and stops at that level until the next actuation of the conveyor 122' occurs.

Downward motion of female mold assembly 40 causes the female mold cavity 111 to move downwardly out of engagement with the male mold element 72 and also out of engagement with the formed molded article. The molded article, which in the illustrated embodiment is assumed to be a plastic bottle cap, remains in engagement with the male mold element 72 as indicated at 150 in Fig. 7.

The mold head whose female member has just moved off the downwardly moving conveyor 122' then passes the cap take-off station generally indicated at 43. This station includes a rotating friction belt member 152 which passes around a pulley driven by any suitable power take-off, and also around an idler pulley. For example, belt 152 may be a nylon V-belt with a soft rubber facing on its outer periphery. Belt 152 engages and spins cap member to cause the cap to unscrew from its threaded engagement with the thread 74 on male mold element 72. As a result of the spinning operation, the cap falls off male mold element 72 and drops into a delivery chute which delivers the cap to a container or other suitable receiving means positioned adjacent the molding apparatus.

In order to return cracking assembly 100 including triangular plate 96 and posts 102, 104 and 106 to the position which they originally occupied before being rotated by their abutment with track 140, a second track 160 is provided adjacent the path of triangular plate 96 as it leaves cap take-off station 43. Track 160 depends downwardly from the same shelf-like support which carries track 140. The track 160 is a circumferentially extending arcuate strip which is stationary with respect to support structure 14. Track 160 is positioned radially outwardly of track 140 and is so located as to be in the path of post member 102 when triangular plate 96 is in position B shown in Fig. 1. It can be seen when post 102 strikes the outer end of track 160 it will rotate triangular plate 96 in a clockwise direction with respect to the view shown in Fig. 1, thereby causing plate 96 to return to the position A in which posts 102 and 106 lie radially outwardly of post 104. The cracking assembly including plate 96 and posts 102, 104 and 106 are then properly oriented for the next cracking operation when plate 96 again reaches track 140 as previously described.

Summary of operation

Before beginning to rotate the carriage 18, the molding heads are pre-heated to the necessary molding temperature. A suitable valve is opened to introduce the fuel mixture of gas and air into supply conduit 44. The gas mixture passes from conduit 44 into manifold 48 from whence it is distributed through supply conduits 50 to burners 52 and 70 associated with each of the plurality of molding heads carried by carriage 18. An indicator flame 49 issuing from a center opening at the top of manifold 48 provides a visual indication of the flame shape and intensity at each burner. Burners 52 and 70 of each mold head are individually lighted through the respective exhaust openings 66. Burners 52 and 70 are ignited a sufficient length of time before the molding operation is to commence to heat male and female molding assemblies 38 and 40 to the necessary molding temperature.

With the male and female molding assemblies 38 and 40 at the proper molding temperature, prime mover 22 is energized to cause rotation of shaft 24 and pinion gear 26. Gear 26 meshes with ring gear 28 and causes rotation of turret or carriage 18. Rotation of shaft 24 also causes actuation of the feeding mechanism for supply station 17 through power take-off 37 (Fig. 2) causing molding ingredients to be dispensed to molding cavity 111 of the female mold member 40.

The driving mechanisms 128 and 128' which cause the intermittent rotation of conveyor lugs 130 at elevating station 21 and of conveyor lugs 130' of lowering station 31 are set in motion simultaneously with the rotation of carriage 18. The rotating friction belt 152 of cap take-off station 43 also begins to rotate from a suitable prime mover.

Figure 4:
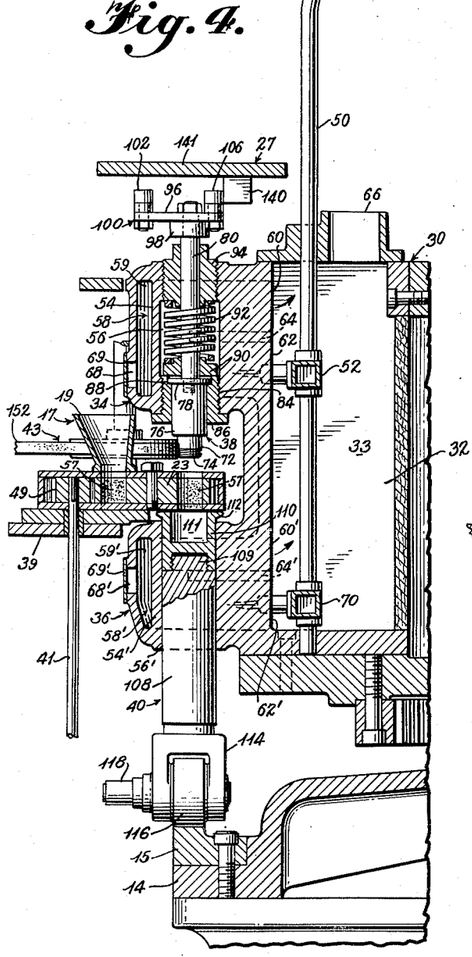
Fig. 4 is a view in vertical section along line 4—4 of Fig. 3.

At the beginning of the molding cycle, male and female mold elements 38 and 40 are in the separated position shown in Fig. 4 in which roller 116 rides along depressed portion 120 of the track 15. In this position, the mold cavity 111 of each successive female mold member rides underneath the dispensing disk 23 of dispensing station 17 and receives therefrom a supply of molding ingredient. The molding head then passes beyond the dispensing station 17 to elevating station 21 where stub shaft 118 of the female molding assembly is engaged by the jaws of one of the vertically moving lug members 130. The female molding assembly 38 including shaft 108 and roller 116 is elevated onto horizontal arm 138 on angle member 136. The stub shaft rolls along arm 138 until roller 116 contacts inclined track surface 132. Roller 116 rolls up inclined surface 132 and finally reaches elevated portion 25 of track 15. When the roller has reached elevated portion 25 on track 15, the female mold assembly has been moved upwardly to the position shown in Fig. 5 in which male molding element 72 has entered cavity 111 of the female mold element as shown in Fig. 5. Shoulder 78 of shank portion 76 of the male mold member has been elevated a short distance, say 1/32 of an inch, above counterbored shoulder 88 on which it normally seats, against the force of spring 92. Thus, the pressure of spring 92, which may be of the magnitude of approximately 1800 pounds per square inch, for example, urges male molding element 72 into engagement with the molding material in the cavity 111.

The molding head is then carried by turret or carriage 18 for substantially 270 degrees of rotation of the carriage 18 during which time the heat from the burners 52 and 70 continues to heat the male and female mold members and cures the molding material.

After approximately 270 degrees of rotation, the given molding head reaches depressed portion 29 of the track 15 which is at a level approximately ⅛ of an inch below that of the elevated portion 25 of the track. Roller 116 drops down to the level of the depressed portion 29 and in so doing relieves the pressure exerted by spring 92 on male molding element 72. While roller 116 is riding on depressed track portion 29, cracking assembly 100 carried at the upper end of stem 80 of male molding assembly 38 strikes against the end of track 140 and causes triangular plate 96 to spin around from position A to position B shown in Fig. 1. This causes threaded portion 74 of the male member 38 to become loosened with respect to the molded article.

During the period in which roller 116 moves along the depressed portion 29 of the track, stub shaft 118 moves along upper horizontal edge 144 of angle member 142 which delivers stub shaft 118 to the downwardly moving conveyor at lowering station 31. The female mold assembly is lowered by the conveyor at station 31 until roller 116 reaches the depressed surface 120 of track 15. This removes the female mold cavity 110 from engagement with the molded article 150 which remains temporarily on the end of the male molding member 72.

The mold head then reaches cap take-off station 43 at which the rotating friction belt 152 rotates cap member 150 out of engagement with threads 74 on male mold element 72 and causes cap 150 to drop into a chute positioned adjacent take-off station 43.

A short distance beyond cap take-off station 43, cracking assembly 100 carried at the upper end of stem 80 of the male molding assembly strikes against the end of track 160 which causes triangular-shaped plate 96 to be moved from position B to which it was moved by track 140, back to position A in readiness for the next cracking operation. This completes the cycle of operation.

It can be seen from the foregoing that there is provided in accordance with this invention an apparatus which has great utility in the manufacture of small molded articles such as threaded bottle caps, for example. This apparatus is a self-contained unit which automatically operates to efficiently mass-produce the molded article from the initial raw material state to the final finished product. An important advantage of the apparatus is the fact that the conveyor devices provided at the raising and lowering stations reduce to a minimum the space requirements of the non-productive steps of the molding cycle, thereby permitting maximum utilization of the productive capacity of the apparatus.

While there has been shown and described a particular embodiment of the invention, it will be obvious to those skilled in the art that various changes and modifications can be made therein without departing from the invention and, therefore, it is aimed to cover all such changes and modifications as fall within the true spirit and scope of the invention.

What we claim as our invention is:

1. A molding machine comprising a molding head, said molding head having a pair of aligned molding elements, means for moving said molding head along a fixed path, means for dispensing a molding material to one of said molding elements of said head, a unidirectionally moving rotatable conveyor means disposed along said path adjacent the beginning thereof for moving said molding elements of said head toward molding engagement with each other, and a unidirectionally moving rotatable conveyor means disposed along said path adjacent the end thereof for moving said molding elements of said head out of molding engagement with each other.

2. A molding machine comprising a molding head, said molding head having a male and a female molding element in alignment with each other, means for moving said molding head along a fixed path, means for dispensing molding material to one of said molding elements, an inclined track means disposed along said path adjacent the beginning thereof and engageable with one of said molding elements for moving said molding element into molding engagement with the other of said elements, a unidirectionally moving rotatable conveyor means disposed adjacent said inclined track for moving said one molding element into engagement with said track, and a unidirectionally moving rotatable conveyor means disposed along said path adjacent the end thereof for moving said one molding element out of molding engagement with the other of said molding elements.

3. A molding machine comprising a molding head, said molding head having a pair of cooperating aligned molding elements, means for moving said molding head along a fixed path, means for dispensing a molding material to one of said molding elements of said head, a guide track extending along said path for substantially the entire length thereof, one of said molding elements being engageable with said track to determine the vertical displacement between said molding elements, said guide track having an elevated portion and a depressed portion, unidirectionally moving means disposed along said path adjacent the beginning thereof for raising one of said molding elements toward said elevated portion of said track, an inclined track portion positioned to receive said one molding element from said unidirectionally moving means for engaging said molding elements in molding relation, and unidirectionally moving means disposed along said path adjacent the end thereof for lowering said one molding element from said elevated portion to said depressed portion of said track to cause said molding elements to be disengaged from their molding relation.

4. A molding machine comprising a molding head, said molding head having a male and female molding element, means for moving said molding head along a fixed path, means for dispensing a molding material to the molding elements of said head, a guide track disposed along said path for adjusting the vertical displacement between said male and female molding elements, said guide track having an elevated portion and a depressed portion, an inclined track portion disposed along said path adjacent the beginning thereof for raising one of said elements to said elevated portion of said track to engage said elements in molding relation with each other, a unidirectionally moving conveyor means for moving said one element from said depressed portion to said inclined track portion and unidirectionally moving means disposed along said path adjacent the end thereof for lowering said one element from said elevated portion to said depressed portion of said track to disengage said elements from their molding relation.

5. A molding machine comprising a molding head, said molding head having a pair of aligned cooperating molding elements, means for moving said molding head along a fixed path, means for dispensing a molding material to one of said molding elements, a guide track disposed along said fixed path for substantially the entire length thereof for determining the vertical displacement between said molding elements, said guide track having an elevated portion and a depressed portion, an inclined track portion disposed along said path adjacent the beginning thereof for moving one of said molding elements to said elevated portion of said track to cause said cooperating molding elements to engage in molding relation, a unidirectionally movable conveyor means disposed adjacent said inclined track portion for moving said one molding element from said depressed track portion to said inclined track portion and a unidirectionally moving conveyor means disposed along said path adjacent the end thereof for lowering said one molding element from said elevated portion to said depressed portion of said track to disengage said cooperating molding elements from their molding relation.

6. A molding machine comprising a molding head, said molding head having a pair of aligned male and female molding elements, spring means for biasing said male molding element toward said female molding element, said female molding element being vertically movable toward and from said male molding element, means for dispensing a molding material to said molding elements, a guide track disposed along the path of movement of said molding head and beneath said female molding element, means carried by said female element and engageable with said guide track, said track having an elevated portion and a depressed portion, an inclined track disposed adjacent the beginning of said path for raising said female molding element onto said elevated portion of said track and into molding engagement with said male molding element, a unidirectionally moving conveyor means for raising said female molding element onto said inclined track portion, said elevated portion of said track extending for a substantial portion of the length of said track to maintain said elements in molding engagement, said spring means being effective to bias said molding elements into engagement when said female molding element engages said elevated portion of said track, and unidirectionally moving conveyor means disposed adjacent the end of said path for lowering said female element out of molding engagement with said male element and onto said depressed portion of said track.

7. A molding machine comprising a molding head, said molding head having a male and female molding element, spring means for biasing said male element toward said female molding element, said female element being spaced below but vertically movable toward said male element, means for dispensing a molding material to said female element, a guide track disposed along the path of movement of said molding head, means carried by said female molding element and engageable with said guide track to determine the vertical displacement of said female element relative to said male element, said guide track having an elevated portion, a portion of intermediate height, a depressed portion, and an inclined portion, said inclined portion being disposed along said path adjacent the beginning thereof for raising said female element onto said elevated portion of said track and into molding engagement with said male element, a unidirectionally moving conveyor means for moving said female element into engagement with said inclined portion, said male element being movable to place its biasing spring under compression when in said molding relation, said elevated portion of said track extending a substantial distance along the path of movement of said molding head to maintain said molding elements in molding engagement, said track portion of intermediate height being disposed adjacent the end of the path of movement of said molding head, said female molding element being movable onto said track portion of intermediate height to relieve pressure on said biasing spring of said male element while still maintaining said molding elements in molding engagement, and a unidirectionally moving conveyor means disposed adjacent the end of said path for lowering said female molding element from said track portion of intermediate height to said depressed track portion to thereby move said molding elements out of molding engagement.

8. A molding machine as defined in claim 7 which includes a means for loosening the engagement of said male molding element with the molded article, said loosening means being disposed along a portion of said path where said guide track is of intermediate height.

9. A molding machine according to claim 1 wherein one of said aligned molding elements is rotatable with respect to the other molding element and said molding machine includes means disposed along said molding head path adjacent the end thereof for rotating said rotatable molding element with respect to the other molding element to loosen said elements relative to each other, said rotating means being operable to rotate said rotatable molding element prior to movement of said molding elements out of molding engagement with each other.

10. A molding machine according to claim 2, wherein said male molding element is rotatable with respect to said female molding element and said molding machine includes a first rotating means disposed along said molding head path adjacent the end thereof, means on said male molding element engageable with said first rotating means to rotate said male molding element with respect to said female molding element to loosen said elements with respect to each other, said loosening occurring prior to movement of said molding elements out of molding engagement with each other, and a second rotating means disposed in advance of said molding head path and engageable by said male molding element means to rotate said male molding element in the opposite direction with respect to said female molding element from the direction of rotation imparted by said first rotating means whereby said male molding element is rotatably repositioned with respect to said female molding element, said second rotating means rotating said male molding element after said molding elements have been moved out of molding engagement with each other and prior to movement of said molding elements into molding engagement with each other by said inclined track means.

11. A molding machine comprising an upright hollow shaft, a rotatable carriage, means supporting said carriage for rotation about said upright shaft, said carriage including a manifold positioned above the upper end of said upright shaft, a gaseous fuel supply conduit extending upwardly through said hollow upright shaft and into said manifold, a plurality of molding heads supported by said carriage and extending radially outwardly with respect to said upright shaft, each molding head including an upper molding element, a lower molding element, a separate heating duct surrounding each molding element and a common exhaust chamber communicating with each of said heating ducts, and a gaseous fuel supply line extending from said manifold to each of said molding heads, each supply line also extending into the common exhaust chamber of the molding head associated therewith and having a burner extending into each of the separate heating ducts of the molding head with which gas supply line is associated.

12. A molding machine according to claim 11, wherein each separate heating duct includes a lower horizontal duct portion, a vertical duct portion located adjacent the radially outermost end of the molding head with which the heating duct is associated, and an upper horizontal duct portion, each gas supply line burner extends into the lower heating duct portion, and each upper heating duct portion communicates with the common exhaust chamber associated therewith whereby combustion gases produced by the burners pass radially outwardly, vertically upwardly, and radially inwardly with respect to each molding element to heat said molding element, said combustion gases being exhausted into said common exhaust chamber.

References Cited in the file of this patent

UNITED STATES PATENTS

| Number | Name | Date |
|---|---|---|
| 1,900,456 | Mead | Mar. 7, 1933 |
| 2,440,366 | Cropp | Apr. 27, 1948 |
| 2,514,486 | Green | July 11, 1950 |
| 2,593,438 | Gora | Apr. 22, 1952 |
| 2,685,708 | Pollock | Aug. 10, 1954 |
| 2,697,250 | Heinzelman | Dec. 21, 1954 |
| 2,699,574 | Gilbert | Jan. 18, 1955 |